(12) United States Patent
Wakamatsu (10) Patent No.: US 7,295,155 B2
(45) Date of Patent: Nov. 13, 2007

(54) SATELLITE POSITIONING APPARATUS AND METHOD

(75) Inventor: Kotaro Wakamatsu, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 292 days.

(21) Appl. No.: 11/073,024

(22) Filed: Mar. 4, 2005

(65) Prior Publication Data

US 2005/0195107 A1 Sep. 8, 2005

(30) Foreign Application Priority Data

Mar. 5, 2004 (JP) ............................. 2004-062032

(51) Int. Cl.
G01S 1/00 (2006.01)
G01S 3/02 (2006.01)
G01C 21/00 (2006.01)
G08G 1/123 (2006.01)

(52) U.S. Cl. ................. 342/357.15; 342/464; 701/213; 701/214; 340/988

(58) Field of Classification Search ................ 342/357.01–357.17, 464; 701/213, 214; 340/995.1–995.28, 988
See application file for complete search history.

(56) References Cited

U.S. PATENT DOCUMENTS

| | | | | |
|---|---|---|---|---|
| 4,114,155 A | * | 9/1978 | Raab | 342/394 |
| 4,638,438 A | * | 1/1987 | Endo et al. | 701/212 |
| 4,731,613 A | * | 3/1988 | Endo et al. | 342/357.14 |
| 4,903,212 A | * | 2/1990 | Yokouchi et al. | 701/216 |
| 4,928,107 A | * | 5/1990 | Kuroda et al. | 342/357.15 |
| 4,949,268 A | * | 8/1990 | Nishikawa et al. | 701/216 |
| 5,493,294 A | * | 2/1996 | Morita | 340/988 |
| 5,506,588 A | | 4/1996 | Diefes et al. | |
| 5,752,219 A | * | 5/1998 | Yoshihara et al. | 701/213 |
| 5,936,571 A | * | 8/1999 | Desjardins | 342/357.08 |

(Continued)

FOREIGN PATENT DOCUMENTS

EP 0 353 849 A 2/1990

(Continued)

OTHER PUBLICATIONS

Eureopean Search Report dated Mar. 28, 2006.

*Primary Examiner*—Thomas H. Tarcza
*Assistant Examiner*—Hien Ly
(74) *Attorney, Agent, or Firm*—Brinks Hofer Gilson & Lione (57) ABSTRACT

Available-satellite data indicating satellites available for satellite positioning is obtained from a GPS receiver, and satellites continuously available for satellite positioning in the current instance and the previous n times are extracted as candidate satellites referring to available-satellite record data. Four of the candidate satellites are selected so that the satellites used for satellite positioning the previous time are selected with priority as the satellites to be used for satellite positioning in the current instance, and the selected satellites are set in designated-satellite data. The GPS receiver performs three-dimensional positioning using the four satellites designated by the designated-satellite data. If the number of extracted candidate satellites is three, these three extracted candidate satellites are selected as the designated satellites and are set in the designated-satellite data. The GPS receiver performs two-dimensional positioning using these three designated satellites. If the number of extracted candidate satellites is smaller than three, satellite positioning is not performed.

10 Claims, 7 Drawing Sheets

U.S. PATENT DOCUMENTS

| | | |
|---|---|---|
| 6,167,347 A | 12/2000 | Lin et al. |
| 6,392,590 B1 * | 5/2002 | Kagemoto ............. 342/357.06 |
| 6,397,147 B1 | 5/2002 | Whitehead |
| 6,415,229 B1 | 7/2002 | Diekhans |
| 6,430,504 B1 | 8/2002 | Gilbert et al. |
| 6,525,688 B2 * | 2/2003 | Chou et al. ............ 342/357.06 |
| 6,882,936 B2 * | 4/2005 | Desjardins .................. 701/213 |
| 6,917,330 B2 * | 7/2005 | Ohmura et al. ........ 342/357.15 |
| 2001/0047243 A1 * | 11/2001 | Kohli ......................... 701/213 |
| 2003/0083814 A1 * | 5/2003 | Gronemeyer ............... 701/213 |
| 2003/0083816 A1 * | 5/2003 | Imakado et al. ............ 701/213 |
| 2003/0090414 A1 * | 5/2003 | Syrjarinne et al. ..... 342/357.06 |
| 2003/0231132 A1 * | 12/2003 | Park et al. .............. 342/357.15 |
| 2004/0041729 A1 * | 3/2004 | Rowitch ................ 342/357.15 |
| 2004/0087270 A1 * | 5/2004 | Krasner ..................... 455/12.1 |
| 2004/0220734 A1 * | 11/2004 | Gronemeyer ............... 701/214 |
| 2006/0114151 A1 * | 6/2006 | Iwami ................... 342/357.06 |

FOREIGN PATENT DOCUMENTS

| | | |
|---|---|---|
| JP | H05-297104 | 11/1993 |
| JP | H06-281721 | 10/1994 |

* cited by examiner

| | T-5 | T-4 | T-3 | T-2 | T-1 | T |
|---|---|---|---|---|---|---|
| 303→ / →302 | 1 | 1 | 1 | 1 | 1 | 1 |
| | 4 | 2 | 3 | 2 | 2 | 2 |
| | 5 | 5 | 5 | 5 | 5 | 5 |
| | 7 | 7 | 6 | 7 | 7 | 7 |
| | 8 | 8 | 8 | 8 | 8 | 8 |
| | 9 | 9 | 9 | 9 | 9 | 9 |
| | 11 | 11 | 11 | 11 | 11 | 11 |
| | 12 | 12 | 13 | 13 | 13 | 13 |
| | | 13 | | | | |

| | T-5 | T-4 | T-3 | T-2 | T-1 | T |
|---|---|---|---|---|---|---|
| 304 | 1 | 1 | 1 | 1 | 1 | 1 |
| | 5 | 5 | 5 | 5 | 5 | 5 |
| | 9 | 9 | 9 | 9 | 9 | 9 |
| | 11 | 11 | 11 | 11 | 11 | 11 |

FIG. 5B

| | T-5 | T-4 | T-3 | T-2 | T-1 | T |
|---|---|---|---|---|---|---|
| 303 / 302 | 1 | 1 | 1 | 1 | 1 | 1 |
| | 2 | 2 | 2 | 2 | 2 | 2 |
| | 5 | 5 | 5 | 5 | 5 | 5 |
| | 7 | 6 | 7 | 7 | 7 | 7 |
| | 8 | 8 | 8 | 8 | 8 | 8 |
| | 9 | 9 | 9 | 9 | 9 | 9 |
| | 11 | 11 | 11 | 11 | 11 | 13 |
| | 12 | 13 | 13 | 13 | 13 | 15 |

| | T-5 | T-4 | T-3 | T-2 | T-1 | T |
|---|---|---|---|---|---|---|
| 304 | 1 | 1 | 1 | 1 | 1 | 1 |
| | 5 | 5 | 5 | 5 | 5 | 5 |
| | 9 | 9 | 9 | 9 | 9 | 8 |
| | 11 | 11 | 11 | 11 | 11 | 9 |

FIG. 5C

| | T-5 | T-4 | T-3 | T-2 | T-1 | | T | |
|---|---|---|---|---|---|---|---|---|
| 303 → | 1 | 1 | 1 | 1 | 1 | | 1 | ← 302 |
| | 2 | 2 | 2 | 2 | 2 | | 5 | |
| | 5 | 5 | 5 | 5 | 5 | | 7 | |
| | 7 | 6 | 7 | 7 | 7 | | 8 | |
| | 8 | 8 | 8 | 8 | 8 | | 10 | |
| | 9 | 9 | 9 | 9 | 9 | | 13 | |
| | 11 | 11 | 11 | 11 | 11 | | 15 | |
| | 12 | 13 | 13 | 13 | 13 | | 17 | |

| | T-5 | T-4 | T-3 | T-2 | T-1 | | T | |
|---|---|---|---|---|---|---|---|---|
| 304 → | 1 | 1 | 1 | 1 | 1 | | 1 | ← 304 |
| | 5 | 5 | 5 | 5 | 5 | | 5 | |
| | 9 | 9 | 9 | 9 | 9 | | 8 | |
| | 11 | 11 | 11 | 11 | 11 | | | |

FIG. 5D

| | T-5 | T-4 | T-3 | T-2 | T-1 | | T | |
|---|---|---|---|---|---|---|---|---|
| 303 → | 1 | 1 | 1 | 1 | 1 | | 1 | ← 302 |
| | 3 | 2 | 2 | 2 | 2 | | 5 | |
| | 5 | 5 | 5 | 5 | 5 | | 7 | |
| | 6 | 7 | 7 | 7 | 7 | | 8 | |
| | 8 | 8 | 8 | 8 | 8 | | 10 | |
| | 9 | 9 | 9 | 9 | 10 | | 13 | |
| | 11 | 11 | 11 | 11 | 13 | | 15 | |
| | 13 | 13 | 13 | 13 | 15 | | 17 | |
| | | | | | 17 | | | |

| | T-5 | T-4 | T-3 | T-2 | T-1 | | T | |
|---|---|---|---|---|---|---|---|---|
| 304 → | 1 | 1 | 1 | 1 | 1 | | 1 | ← 304 |
| | 5 | 5 | 5 | 5 | 5 | | 5 | |
| | 9 | 9 | 9 | 9 | 8 | | 8 | |
| | 11 | 11 | 11 | 11 | | | 13 | |

| T-5 | T-4 | T-3 | T-2 | T-1 |
|---|---|---|---|---|
| 1 | 1 | 1 | 1 | 1 |
| 2 | 2 | 2 | 2 | 2 |
| 5 | 5 | 5 | 5 | 5 |
| 7 | 6 | 7 | 7 | 7 |
| 8 | 8 | 8 | 8 | 8 |
| 9 | 9 | 9 | 9 | 9 |
| 11 | 11 | 11 | 11 | 11 |
| 12 | 13 | 13 | 13 | 13 |
|  |  |  |  |  |

| T |
|---|
| 1 |
| 3 |
| 5 |
| 7 |
| 10 |
| 13 |
| 15 |
| 17 |

→ 302

304 →

| T-5 | T-4 | T-3 | T-2 | T-1 |
|---|---|---|---|---|
| 1 | 1 | 1 | 1 | 1 |
| 5 | 5 | 5 | 5 | 5 |
| 9 | 9 | 9 | 9 | 9 |
| 11 | 11 | 11 | 11 | 11 |

| T |
|---|
|  |
|  |
|  |
|  |

→ 304

SELECTED-SATELLITE DATA

| T-5 | T-4 | T-3 | T-2 | T-1 |
|---|---|---|---|---|
| 1 | 1 | 1 | 1 | 1 |
| 2 | 2 | 2 | 2 | 3 |
| 5 | 5 | 5 | 5 | 5 |
| 6 | 7 | 7 | 7 | 8 |
| 8 | 8 | 8 | 8 | 10 |
| 9 | 9 | 9 | 9 | 13 |
| 11 | 11 | 11 | 11 | 15 |
| 13 | 13 | 13 | 13 | 17 |
|  |  |  |  |  |

| T |
|---|
| 1 |
| 3 |
| 5 |
| 8 |
| 10 |
| 13 |
| 17 |

→ 302

304 →

| T-5 | T-4 | T-3 | T-2 | T-1 |
|---|---|---|---|---|
| 1 | 1 | 1 | 1 |  |
| 5 | 5 | 5 | 5 |  |
| 9 | 9 | 9 | 9 |  |
| 11 | 11 | 11 | 11 |  |

| T |
|---|
| 1 |
| 5 |
| 13 |
|  |

→ 304

SATELLITE POSITIONING APPARATUS AND METHOD

BACKGROUND OF THE INVENTION

1. Field of the Invention

The present invention relates to a satellite positioning apparatus for use in a satellite positioning system, such as the global positioning system (GPS), for determining the position of the apparatus based on signals received from satellites.

2. Description of the Related Art

GPS is a well-known satellite navigation system including a plurality of satellites and a satellite positioning apparatus that moves along with a mobile object, e.g., a vehicle.

One known positioning technique for use in GPS receivers serving as such GPS satellite positioning apparatuses is positioning with the use of only signals received from high-elevation satellites, thereby reducing multipath effects on the positioning accuracy, which are caused by obstacles, such as buildings (see, for example, Japanese Unexamined Patent Application Publication No. 6-281721).

Another known positioning technique for use in GPS receivers is positioning with the use of signals received from a group of satellites providing the best DOP (Dilution of Precision) that is determined from satellites from which the GPS receivers can receive signals (see, for example, Japanese Unexamined Patent Application Publication No. 5-297104). DOP is a measure of the geometrical strength of the satellite configuration.

The positioning accuracy and error of a satellite positioning apparatus vary depending upon a combination of satellites used for positioning. Frequent changes of the satellites used for positioning can deteriorate the positioning stability of satellite navigation, and can cause position jumps or positioning errors. Such position jumps or positioning errors make it difficult to correct the position determined by the satellite navigation apparatus to a correct position using a correction technique, e.g., map matching between a trajectory defined by determined position records and a road map view.

SUMMARY OF THE INVENTION

Accordingly, it is an object of the present invention to provide a satellite positioning apparatus that provides high positioning accuracy and stability.

In one embodiment of the present invention, a satellite positioning apparatus that performs positioning based on a signal received from a satellite includes an available-satellite selecting unit that, each time satellite positioning is performed, selects a plurality of available satellites available for satellite positioning from satellites whose signals have been received, the available satellites being satellites meeting a predetermined condition, a designated-satellite selecting unit that, each time satellite positioning is performed, selects a predetermined number of designated satellites to be used for satellite positioning each time from the plurality of available satellites selected by the available-satellite selecting unit, the predetermined number of designated satellites being selected so that when the plurality of available satellites include a predetermined number of satellites selected as designated satellites for satellite positioning the previous time, the predetermined number of satellites selected as the designated satellites for the satellite positioning the previous time are selected with priority as the designated satellites to be used for the satellite positioning each time, and a satellite positioning unit that performs satellite positioning each time using the signals received from the designated satellites selected by the designated-satellite selecting unit.

In the satellite positioning apparatus, when a combination of satellites is continuously available for satellite positioning, this combination of satellites can continuously be used for satellite positioning. Thus, satellite positioning using the same combination of satellites with priority can be realized, leading to stable satellite positioning while suppressing frequent changes of the combination of designated satellites.

In another embodiment of the present invention, a satellite positioning apparatus that performs positioning based on a signal received from a satellite includes an available-satellite selecting unit that, each time satellite positioning is performed, selects a plurality of available satellites available for satellite positioning from satellites whose signals have been received, the available satellites being satellites meeting a predetermined condition, a candidate-satellite selecting unit that selects a plurality of candidate satellites each time satellite positioning is performed, the candidate satellites being satellites continuously selected a predetermined number of times or more as the available satellites by the available-satellite selecting unit, a designated-satellite selecting unit that, each time satellite positioning is performed, selects a predetermined number of designated satellites to be used for satellite positioning each time from the plurality of candidate satellites selected by the candidate-satellite selecting unit, the predetermined number of designated satellites being selected so that when the plurality of candidate satellites include a predetermined number of satellites selected as designated satellites for satellite positioning the previous time, the predetermined number of satellites selected as the designated satellites for the satellite positioning the previous time are selected with priority as the designated satellites to be used for the satellite positioning each time, and a satellite positioning unit that performs satellite positioning each time using the signals received from the designated satellites selected by the designated-satellite selecting unit.

In the satellite positioning apparatus according to a preferred embodiment, satellites to be used for satellite positioning each time may be selected from satellites stably available for satellite positioning for a predetermined period of time or longer up to now so that the combination of satellites to be used for the satellite positioning each time can be as similar as possible to the combination of satellites used for satellite positioning the previous time. It is highly probable that the satellites stably available for satellite positioning for a predetermined period of time or longer up to now will also be stably available for satellite positioning in the future. Therefore, more stable satellite positioning continuously using the same combination of satellites can be realized.

In the satellite positioning apparatus including the candidate-satellite selecting unit, when the number of candidate satellites selected by the candidate-satellite selecting unit is n or greater, where n is an integer greater than three, the designated-satellite selecting unit may select n satellites as the designated satellites to be used for the satellite positioning each time. When the number of designated satellites selected by the designated-satellite selecting unit is n, the satellite positioning unit may perform three-dimensional positioning using the signals received from the n designated satellites. In this case, n may be four.

When the number of candidate satellites selected by the candidate-satellite selecting unit is three, the designated-satellite selecting unit may select the three satellites as the designated satellites to be used for the satellite positioning each time. When the number of designated satellites selected by the designated-satellite selecting unit is three, the satellite positioning may perform two-dimensional positioning using the signals received from the three designated satellites.

Thus, even if the number of stably available satellites is three, stable two-dimensional positioning can be performed while suppressing frequent changes of the combination of designated satellites with high probability, which is normally caused by continuous three-dimensional positioning using four or more satellites.

In the satellite positioning apparatus including the candidate-satellite selecting unit, preferably, the candidate satellites selected by the candidate-satellite selecting unit are satellites that are continuously selected a predetermined number of times or more as the available satellites by the available-satellite selecting unit each time satellite positioning is performed and that have a variation level of signal receiving intensity for a most recent predetermined period of time smaller than a predetermined level. This allows for satellite positioning without multipath effects.

In the satellite positioning apparatus, the available satellites selected by the available-satellite selecting unit may be satellites having at least an elevation angle greater than a predetermined value. Alternatively, the available satellites selected by the available-satellite selecting unit may be satellites having at least a signal receiving intensity level higher than a predetermined level, or satellites providing the best or better dilution of precision than a predetermined level.

The satellite positioning apparatus described above may be used in a navigation apparatus for determining a current vehicle position. The navigation apparatus may include the satellite positioning apparatus including the candidate-satellite selecting unit, a self-contained-navigation positioning apparatus that performs positioning using self-contained navigation, and a current-position determining unit that determines the current position based on a position determined by the satellite positioning apparatus and a position determined by the self-contained-navigation positioning apparatus. When the number of candidate satellites selected by the candidate-satellite selecting unit is smaller than three, preferably, the current-position determining unit determines the current position based on only the position determined by the self-contained-navigation positioning apparatus.

Accordingly, if the number of satellites stably available for satellite positioning for a predetermined period of time or longer is smaller than three, the current position may be determined based on self-contained-navigation positioning without using satellite positioning. Thus, the current position can be stably determined while preventing a satellite positioning error due to frequent changes of the combination of satellites used for satellite positioning from affecting determination of the current position.

DESCRIPTION OF THE PREFERRED EMBODIMENTS

Figure 1:
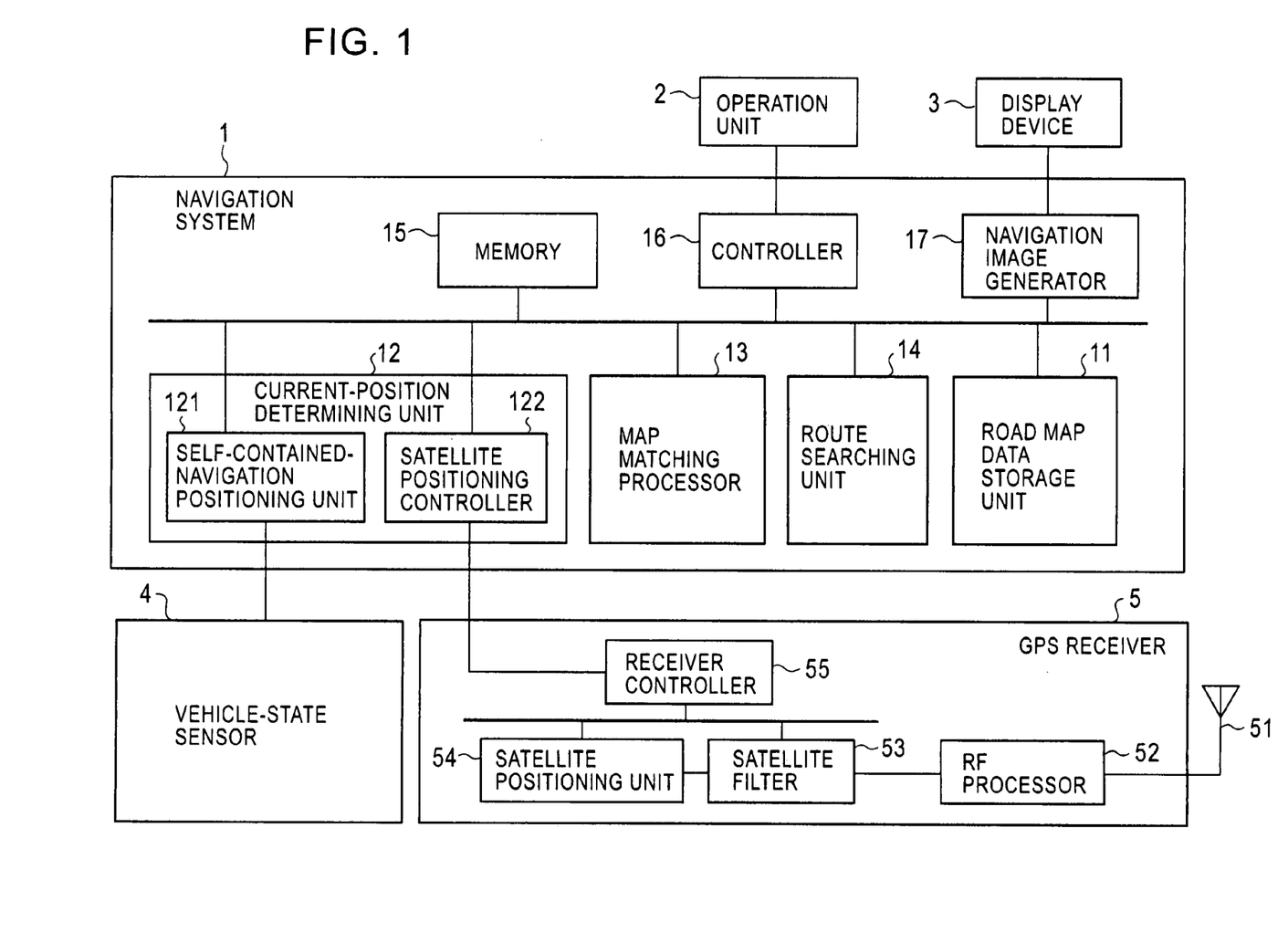
FIG. 1 is a block diagram of a navigation system according to an embodiment of the present invention.

FIG. 1 is a block diagram of an in-vehicle navigation system according to an embodiment of the present invention.

The navigation system includes a navigation apparatus 1, an operation unit 2, a display device 3, a vehicle-state sensor 4, and a GPS receiver 5. The vehicle-state sensor 4 is composed of a group of sensors for detecting the vehicle state, including a direction sensor, such as an angular acceleration sensor or a geomagnetic sensor, and a vehicle speed sensor, such as a vehicle speed pulse sensor.

The navigation apparatus 1 includes a road map data storage unit 11 that is a storage device, such as a digital versatile disk (DVD) drive or a hard disk drive (HDD), storing road map data, a current-position determining unit 12, a map matching processor 13, a route searching unit 14, a memory 15, a controller 16, and a navigation image generator 17.

The current-position determining unit 12 includes a self-contained-navigation positioning unit 121 that performs positioning using self-contained navigation, and a satellite positioning controller 122 that controls the GPS receiver 5 to perform satellite positioning.

The self-contained-navigation positioning unit 121 of the current-position determining unit 12 repeatedly adds a displacement of the vehicle's position to a set reference point to determine the vehicle's position, and outputs the determined position as a first position. The displacement is determined by the vehicle speed and traveling direction output from the vehicle-state sensor 4. The satellite positioning controller 122 of the current-position determining unit 12 repeatedly causes the GPS receiver 5 to determine the vehicle's position based on satellite positioning while controlling positioning parameters of the GPS receiver 5, and outputs the position determined by the GPS receiver 5 as a second position.

The map matching processor 13 repeatedly performs map matching to a road map view including a range within which the vehicle's position determined the previous time is located, which is read from the road map data storage unit 11, based on the first and second positions output from the current-position determining unit 12, and determines the current position and the traveling direction of the vehicle. The map matching processor 13 further repeatedly sets the results in the memory 15, and updates the reference point set in the self-contained-navigation positioning unit 121, if necessary.

More specifically, the map matching processor 13 determines the current vehicle position by, for example, the following method: if the first position outputted from the self-contained-navigation positioning unit 121 is located within a circle having a predetermined radius centered around the second position outputted from the satellite positioning controller 122, the first position is used as a provisional current vehicle position, and a point on a road network that is determined by map matching between the provisional current vehicle position or trajectory and the map view and that is best matched to the provisional current vehicle position is determined as the current vehicle position. If the first position outputted from the self-contained-navigation positioning unit 121 is not located within a circle having a predetermined radius centered around the second position outputted from the satellite positioning controller 122, the second position is used as a provisional current vehicle position, and a point on a road network that is determined by map matching between the provisional current vehicle position or trajectory and the map view and that is best matched to the provisional current vehicle position is determined as the current vehicle position. Then, the reference point set in the self-contained-navigation positioning unit 121 is updated to the second position or the determined current vehicle position.

The map matching processor 13 may use any other algorithm to determine the current vehicle position using the first and second positions outputted from the current-position determining unit 12 and the road map view and to update the reference point set in the self-contained-navigation positioning unit 121.

In the present embodiment, if a satellite positioning failure is reported from the satellite positioning controller 122, the map matching processor 13 uses the first position as a provisional current vehicle position, and determines as the current vehicle position a point on a road network that is determined by map matching between the provisional current vehicle position or trajectory and the map view and that is best matched to the provisional current vehicle position.

The route searching unit 14 searches for a route from the current vehicle position stored in the memory 15 to a destination, and stores the searched route in the memory 15 as a recommended route. The destination is received by the controller 16 from a user via the operation unit 2, and is stored in the memory 15.

The navigation image generator 17 generates a navigation image, and displays the navigation image on the display device 3. The navigation image is configured so that the current vehicle position, the recommended route, and the destination stored in the memory 15 are displayed on the road map stored in the road map data storage unit 11.

Figure 2:
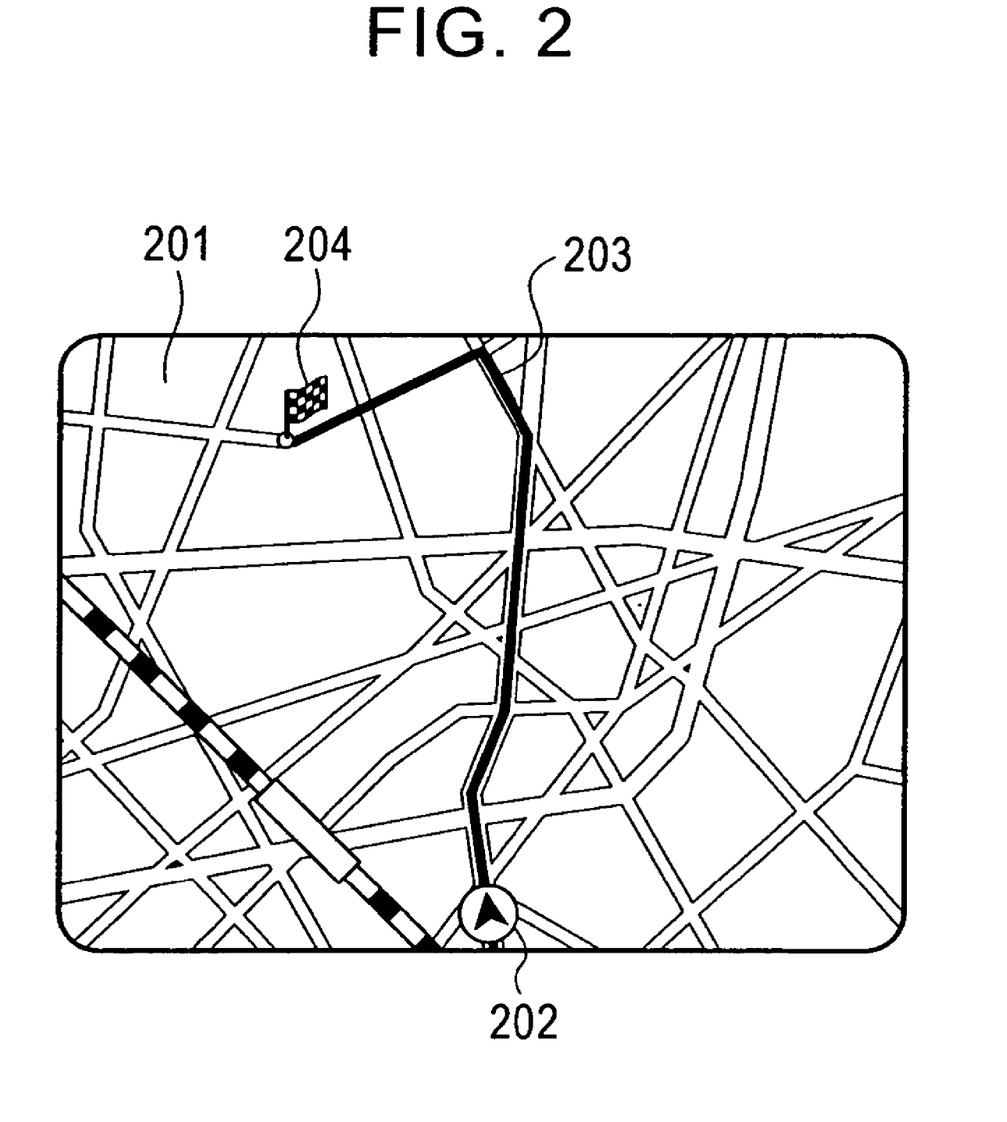
FIG. 2 is an illustration of a navigation image displayed according to an embodiment of the present invention.

FIG. 2 is a navigation image displayed on the display device 3. In the navigation image shown in FIG. 2, a current-position mark 202 indicating the current vehicle position, a route line 203 indicating a recommended route, etc., are displayed on a road map view 201 indicating a range including the vehicle's position. When the range of the road map view 201 includes a destination, a destination mark 204 indicating the destination is also displayed on the road view 201.

When the current vehicle position stored in the memory 15 is near the destination, the controller 16 determines that the vehicle has arrived at the destination, and clears the destination data and the recommended route data stored in the memory 15.

The details of an operation for the satellite positioning controller 122 in the navigation apparatus to output the second position will now be described.

Referring to FIG. 1, the GPS receiver 5 includes an antenna 51, a radio-frequency (RF) processor 52, a satellite filter 53, a satellite positioning unit 54, and a receiver controller 55. The RF processor 52 demodulates satellite baseband signals from radio waves received by the antenna 51, and sends the demodulated satellite signals and the field intensities of the radio waves received from the satellites to the satellite filter 53. The satellite filter 53 selects satellites available for positioning from the satellites whose signals have been received by the RF processor 52. The receiver controller 55 sends information about the satellites selected by the satellite filter 53 to the satellite positioning controller 122. The receiver controller 55 also causes the satellite positioning unit 54 to perform satellite positioning using the signals from the satellites designated by the satellite positioning controller 122, and outputs the position determined by the satellite positioning unit 54 as a satellite-positioning-based position to the satellite positioning controller 122.

For example, an algorithm used by the satellite filter 53 to select a satellite available for positioning from the satellites whose signals have been received may have a combination of the following conditions:

(i) that the field intensity of the radio wave received from the selected satellite be equal to or higher than a predetermined level;

(ii) that the elevation angle of the selected satellite be equal to or greater than a predetermined value; and (iii) that the selected satellite be one of satellites providing the best DOP, which depends upon the geometrical relationship of the satellite configuration.

Known DOP types include horizontal DOP (HDOP) indicating the accuracy of the horizontal position, vertical DOP (VDOP) indicating the accuracy of the vertical position, position DOP (PDOP) indicating the accuracy of the horizontal and vertical positions, time DOP (TDOP) indicating the time accuracy, and geometric DOP (GDOP) indicating the overall accuracy of horizontal and vertical positions and time. In the present embodiment, GDOP or PDOP, preferably, GDOP, is used to select a satellite available for positioning, although other DOP types may be used.

Figure 3:
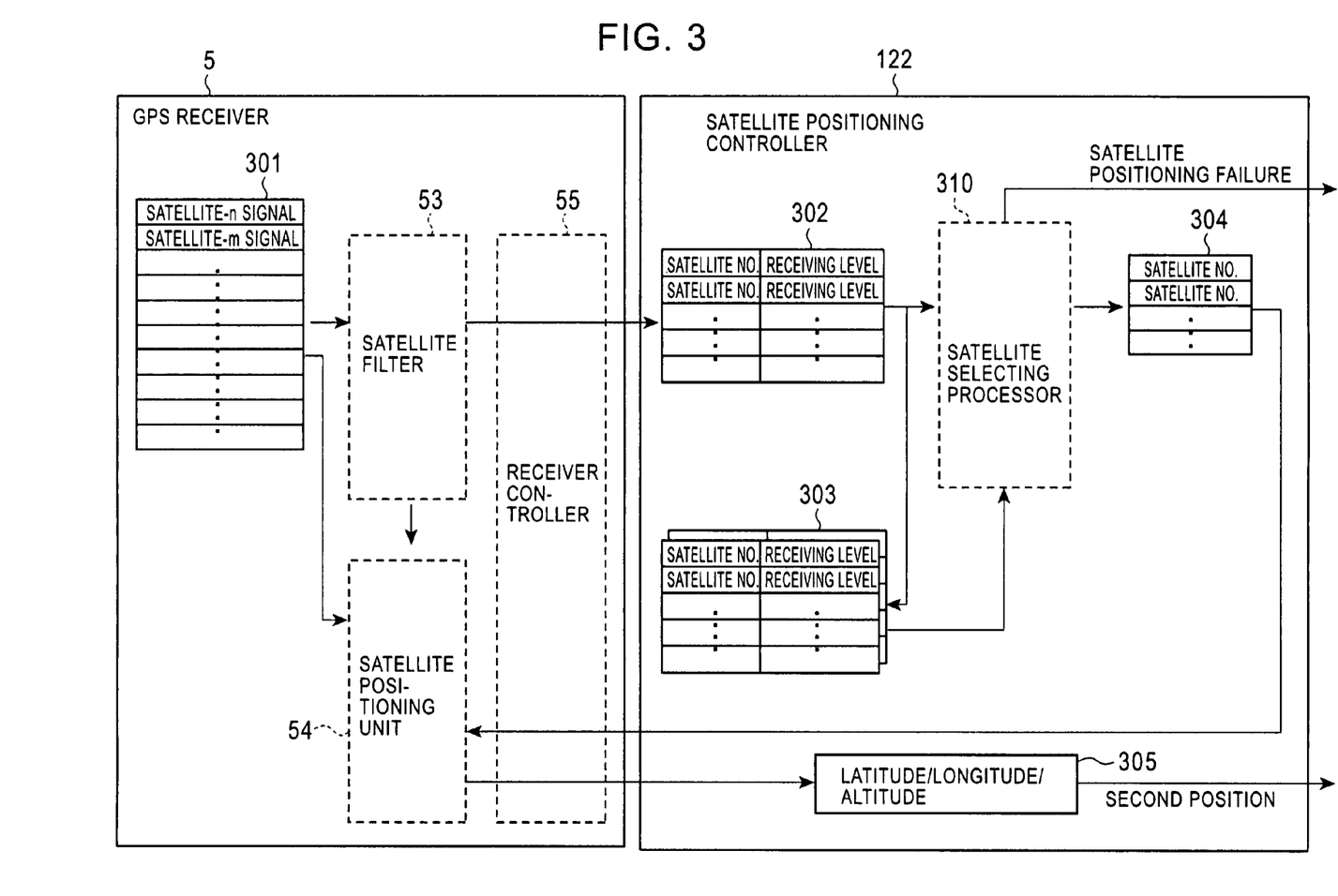
FIG. 3 is a diagram showing an overall satellite positioning operation according to the embodiment of the present invention.

Referring to FIG. 3, the satellite positioning controller 122 includes a satellite selecting processor 310. The satellite selecting processor 310 reads information about satellites available for positioning from the receiver controller 55 as available-satellite data 302. The satellites available for positioning are selected by the satellite filter 53 from satellites 301 whose signals have been received. The receiver controller 55 sends the available-satellite data 302 indicating information about the satellites selected by the satellite filter 53 to the satellite positioning controller 122. The available-satellite data 302 sent from the receiver controller 55 includes at least a satellite number for identifying each satellite and a receiving level indicating the field intensity level of the radio wave received from each satellite.

The satellite positioning controller 122 receives the available-satellite data 302, and the satellite selecting processor 310 selects satellites to be used for actual satellite positioning from the satellites included in the available-satellite data 302 based on the available-satellite data 302 and available-satellite record data 303. The satellite selecting processor 310 transmits designated-satellite data 304 designating the selected satellites to the receiver controller 55. The satellite selecting processor 310 accumulates the received available-satellite data 302 in the available-satellite record data 303.

If the satellite selecting processor 310 cannot select three or more satellites to be used for actual satellite positioning, it reports a satellite positioning failure to the map matching processor 13. In this case, as described above, the map matching processor 13 uses the first position determined by the self-contained-navigation positioning unit 121 as a provisional current vehicle position, and determines as the current vehicle position a point on a road network that is determined by map matching between the provisional current vehicle position or trajectory and the map view and that is best matched to the provisional current vehicle position.

Upon receiving the designated-satellite data 304, the receiver controller 55 causes the satellite positioning unit 54 to perform satellite positioning using the signals received from the satellites designated by the designated-satellite data 304, and sends the position determined by the satellite positioning unit 54 to the satellite positioning controller 122 as positioning data 305. The satellite positioning unit 54 may use satellite parameters, such as the elevation angle and the direction, which are determined by the satellite filter 53 for selecting a satellite available for satellite positioning, to perform satellite positioning, if necessary.

If the number of satellites designated by the designated-satellite data 304 is four or more, the receiver controller 55 causes the satellite positioning unit 54 to perform three-dimensional positioning to determine the horizontal position (i.e., the latitude and the longitude) and the vertical position (i.e., the altitude) using satellite positioning.

If the number of satellites designated by the designated-satellite data 304 is three, the receiver controller 55 causes the satellite positioning unit 54 to perform two-dimensional positioning to determine the horizontal position using satellite positioning. In this case, it is presumed that the vertical position is represented by an average of a predetermined number of vertical positions recently determined by the satellite positioning unit 54. When two-dimensional positioning is performed by the satellite positioning unit 54, the positioning data 306 includes the presumed vertical position as the vertical position.

The satellite positioning controller 122 outputs a position identified by the received positioning data 305 as the second position.

The details of the satellite selecting processor 310 to select satellites to be used for actual satellite positioning will now be described.

Figure 4:
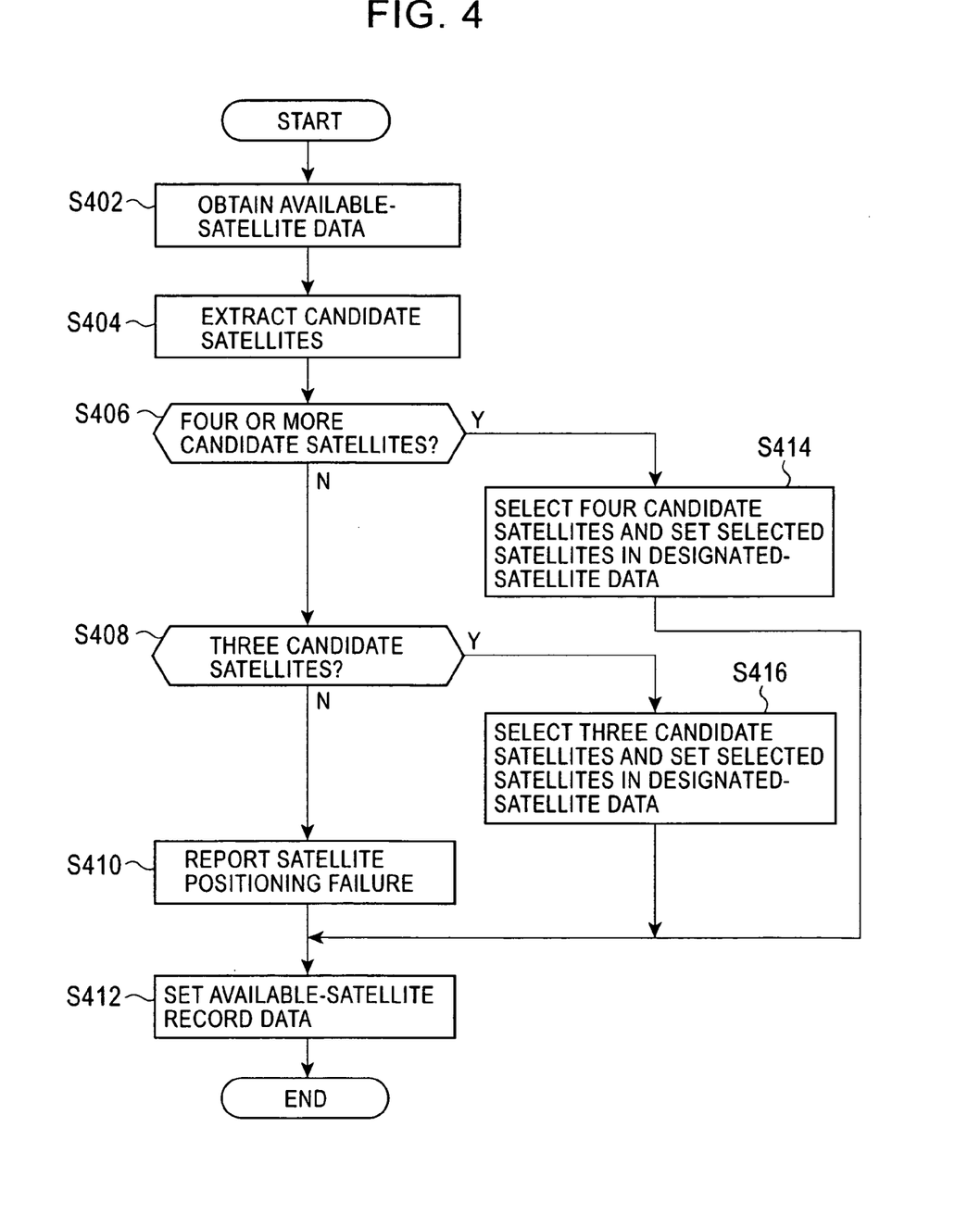
FIG. 4 is a flowchart showing a satellite selection process according to the embodiment of the present invention.

FIG. 4 is a flowchart showing a satellite selection process performed by the satellite selecting processor 310. The satellite selection process is performed at constant intervals (e.g., at one-second intervals).

In the satellite selection process shown in FIG. 4, first, the available-satellite data 302 is obtained from the GPS receiver 5 (act 402). Then, satellites that are recorded in the available-satellite record data 303 for all previous n (e.g., 10) times are extracted from the satellites available for satellite positioning included in the available-satellite data 302. Then, satellites whose variation between the receiving level indicated by the available-satellite data 302 and the most recent receiving level in the receiving levels indicated by the available-satellite record data 303 for the previous n times is smaller than a predetermined value are extracted from the extracted satellites as candidate satellites (act 404).

If the number of extracted candidate satellites is four or more (act 406), four satellites are selected from the four or more extracted candidate satellites so that a candidate satellite (or satellites) selected as the designated satellite (or satellites) the previous time is also selected this time as a designated satellite (or satellites) with priority. The satellite numbers of the four selected candidate satellites are set in the designated-satellite data 304, and the designated-satellite data 304 is then sent to the GPS receiver 5 (act 414). Then, the process proceeds to act 412. In this case, as described above, the satellite positioning unit 54 of the GPS receiver 5 performs three-dimensional positioning using the four satellites designated by the designated-satellite data 304.

If the number of extracted candidate satellites is smaller than four (act 406), it is determined whether the number of extracted candidate satellites is three (act 408). If the number of extracted candidate satellites is three, the three extracted candidate satellites are selected as designated satellites, and the satellite numbers of the three designated satellites are set in the designated-satellite data 304, which is then sent to the GPS receiver 5 (act 416). Then, the process proceeds to act 412. In this case, as described above, the satellite positioning unit 54 of the GPS receiver 5 performs two-dimensional positioning using the three satellites designated by the designated-satellite data 304.

If the number of extracted candidate satellites is smaller than three (act 408), a satellite positioning failure is reported to the map matching processor 13 (act 410). Then, the process proceeds to act 412.

In act 412, the available-satellite data 302 is accumulated in the available-satellite record data 303. Then, the process of this time ends.

For clarification of description of the foregoing satellite selection process, it is assumed that n is 5 and all available satellites selected by the satellite filter 53 have a stable signal level. The satellite selection process in this case will be described with reference to FIGS. 5A to 5D.

Figure 5A:
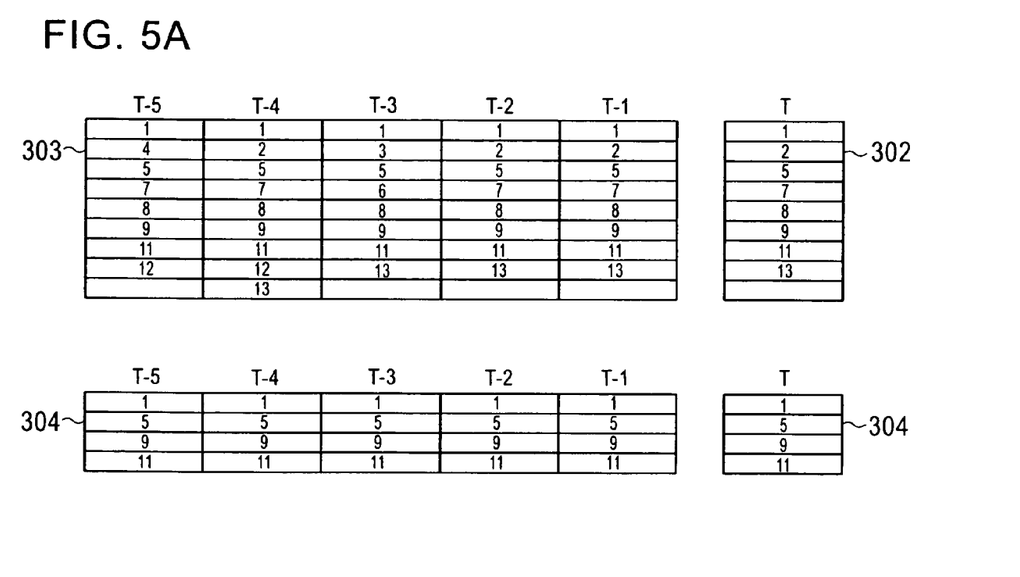
FIGS. 5A to 5D are illustrations of satellite data for use in the satellite selection process according to the embodiment of the present invention.

As shown in FIG. 5A, if satellite numbers 1, 5, 8, 9, and 11 are included in the available-satellite data 302 for this time (T) and the available-satellite record data 303 for all previous five times (T-1 to T-5), the satellites having satellite numbers 1, 5, 9, and 11 selected as the designated satellites the previous time (T-1) are selected as the designated satellites this time (T) and are set in the designated-satellite data 304. Then, three-dimensional positioning using the four designated satellites is performed. As shown in FIG. 5A, once the satellites having satellite numbers 1, 5, 9, and 11 are selected as designated satellites, the satellites having satellite numbers 1, 5, 9, and 11 are continuously selected as designated satellites as long as the available-satellite data 302 includes satellite numbers 1, 5, 9, and 11.

Figure 5B:
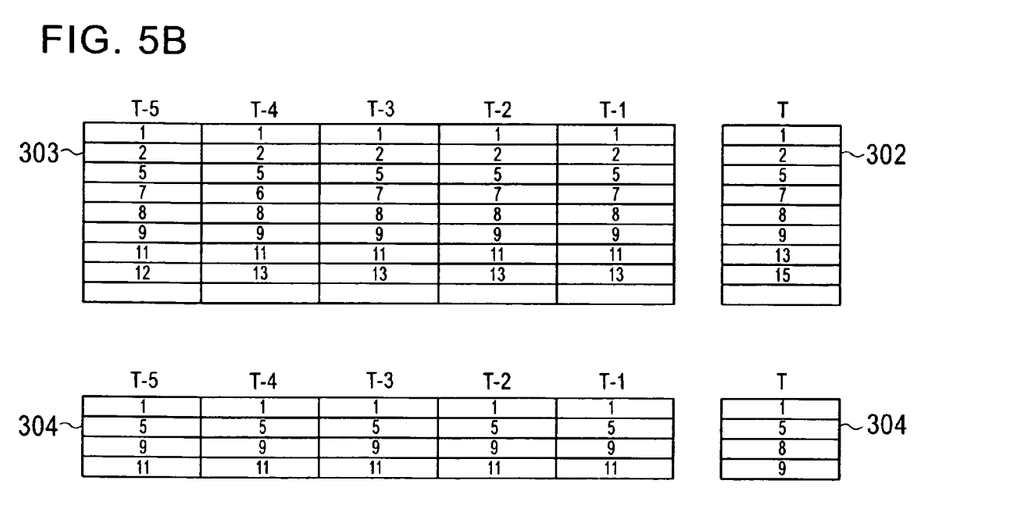

As shown in FIG. 5B, if the satellite having satellite number 11 in the satellites having satellite numbers 1, 5, 9, and 11 continuously selected by the designated-satellite data 304 for the previous five times (T-1 to T-5) is not included in the available-satellite data 302 for this time (T), four of the satellites having satellite numbers 1, 2, 5, 8, and 9 included in the available-satellite data 302 for this time (T) and the available-satellite record data 303 for all previous five times (T-1 to T-5) are selected as designated satellites. In this case, the satellites having satellite numbers 1, 5, and 9 selected as the designated satellites the previous time (T-1) are selected with priority as designated satellites. Thus, the three satellites having satellite numbers 1, 5, and 9 are selected as the designated satellites this time (T). As the remaining one designated satellite, a satellite having one of satellite numbers 2 and 8 (in FIG. 5B, satellite number 8) is selected. In the example shown in FIG. 5B, therefore, the satellites having satellite numbers 1, 5, 8, and 9 are selected as the designated satellites this time (T). Then, three-dimensional positioning is performed using these four designated satellites. Once the satellites having satellite numbers 1, 5, 8, and 9 are selected as designated satellites, the satellites having satellite numbers 1, 5, 8, and 9 are continuously selected as designated satellites as long as the available-satellite data 302 includes satellite numbers 1, 5, 8, and 9.

Figure 5C:
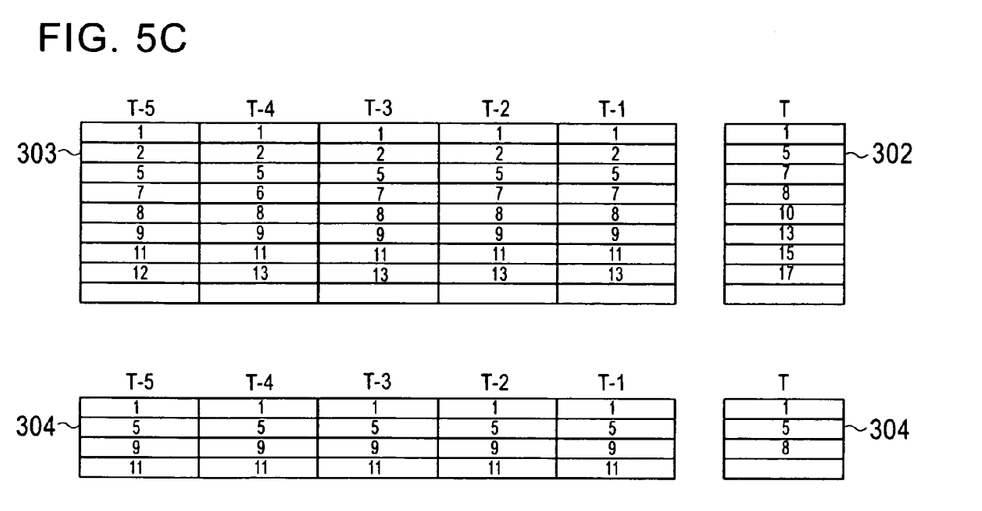

As shown in FIG. 5C, satellite number 11 in the satellites having satellite numbers 1, 5, 9, and 11 continuously selected by the designated-satellite data 304 for the previous five times (T-1 to T-5), shown in FIG. 5A, is not included in the available-satellite data 302 for this time (T), and the three satellites having satellite numbers 1, 5, and 8 are still included in the available-satellite data 302 for this time (T) and the available-satellite record data 303 for the previous five times (T-1 to T-5). In this case, these three satellites are selected as the designated satellites this time (T), and two-dimensional positioning is performed using these three designated satellites.

Once the satellites having satellite numbers 1, 5, and 8 are selected as designated satellites, the three satellites having satellite numbers 1, 5, and 8 are continuously selected as designated satellites as long as the three satellites having satellite numbers 1, 5, and 8 are included in the available-satellite data 302 for a given time (T) and the available-satellite record data 303 for the previous five times (T-1 to T-5).

Figure 5D:
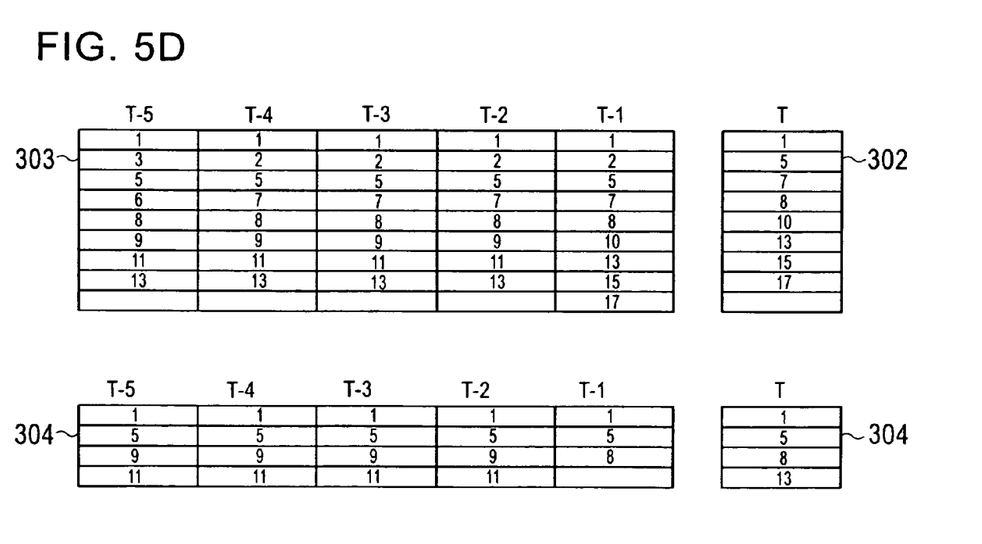

Then, as shown in FIG. 5D, if the number of satellite numbers included in the available-satellite data 302 for this time (T) and the available-satellite record data 303 for the previous five times (T-1 to T-5) is changed to four or more, i.e., satellite numbers 1, 5, 8, and 13, four of these satellites are selected as the designated satellites this time (T), and three-dimensional positioning restarts using these four designated satellites. The satellites having satellite numbers 1, 5, 8, and 13 are continuously selected as designated satellites as long as the available-satellite data 302 includes satellite numbers 1, 5, 8, and 13.

Figure 6A:
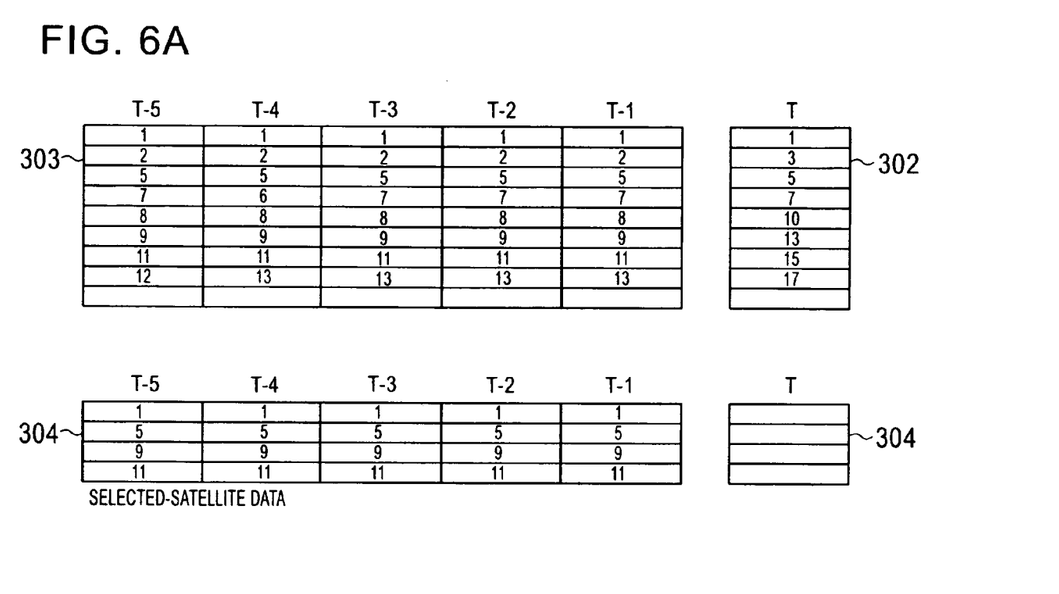
FIGS. 6A and 6B are illustrations of satellite data for use in the satellite selection process according to the embodiment of the present invention.

As shown in FIG. 6A, if satellite numbers 1 and 5 are included in the available-satellite data 302 for this time (T) and the available-satellite record data 303 for all previous five times (T-1 to T-5), satellite positioning is stopped because it is determined that no satellite is designated, and a satellite positioning failure is reported to the map matching processor 13.

Figure 6B:
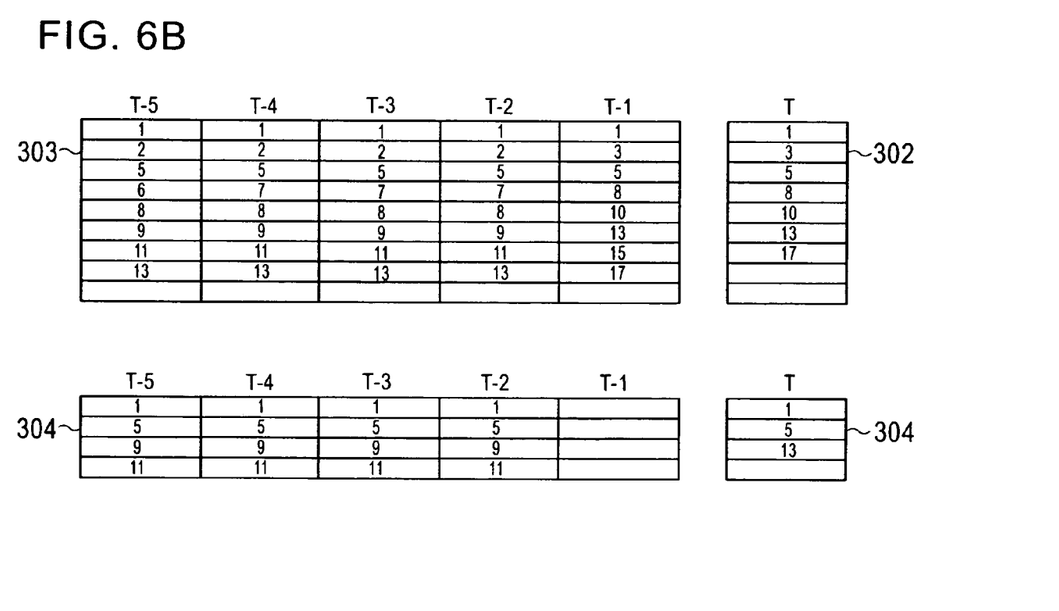

Then, as shown in FIG. 6B, when the number of satellite numbers included in the available-satellite data 302 for this time (T) and the available-satellite record data 303 for all previous five times (T-1 to T-5) is turned to three or more (in FIG. 6B, satellite numbers 1, 5, and 13), designated satellites are selected in the way described above, and satellite positioning is performed again depending upon the number of designated satellites.

According to this embodiment, if the number of satellites stably available for satellite positioning for a predetermined period of time or longer up to now is four or more, four of the four or more satellites are selected for satellite positioning this time so that the combination of four satellites to be used for satellite positioning this time can be as similar as possible to the combination of four satellites used for satellite positioning the previous times. It is highly probable that the satellites stably available for satellite positioning for a predetermined period of time or longer up to now will also be stably available for satellite positioning in the future.

Therefore, stable three-dimensional positioning using the same combination of satellites can be realized.

If the number of satellites stably available for satellite positioning for a predetermined period of time or longer is three, two-dimensional positioning is performed using these three satellites. Thus, stable two-dimensional positioning can be performed while suppressing frequent changes of the combination of designated satellites with high probability, which is normally caused by continuous three-dimensional positioning using four or more satellites.

If the number of satellites stably available for satellite positioning for a predetermined period of time or longer is smaller than three, the current vehicle position is determined based on self-contained-navigation positioning without using satellite positioning. Thus, the current vehicle position can be stably determined while preventing a positioning error due to frequent changes of the combination of designated satellites used for satellite positioning with high probability, which is caused by continuous satellite positioning.

Since satellites having an unstable receiving level are not used for satellite positioning, satellite positioning without multipath effects can be realized.

The navigation apparatus may be implemented as a computer including a central processing unit (CPU), the memory 15, and an external storage device. In this case, the satellite selecting processor 310 may be implemented by the computer executing a program defining the processing described above.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A satellite positioning apparatus that performs positioning based on a signal received from a satellite, comprising:
    an available-satellite selecting unit operable to select a plurality of available satellites available for satellite positioning from satellites whose signals have been received;
    a designated-satellite selecting unit operable to select a predetermined number of designated satellites to be used for satellite positioning from the plurality of available satellites selected by the available-satellite selecting unit, the predetermined number of designated satellites being selected so that when the plurality of available satellites include a predetermined number of satellites that were previously selected as designated satellites for satellite positioning, the predetermined number of satellites selected as the designated satellites for the satellite positioning at the previous time are designated as priority satellites for further satellite positioning; and
    a satellite positioning unit operable to perform satellite positioning using the signals received from the priority satellites.

2. A satellite positioning apparatus that performs positioning based on a signal received from a satellite, comprising:
    an available-satellite selecting unit operable to select a plurality of available satellites available for satellite positioning from satellites whose signals have been received;
    a candidate-satellite selecting unit operable to select a plurality of candidate satellites from the available satellites selected by the available-satellite selecting unit;
    a designated-satellite selecting unit operable to select a predetermined number of designated satellites to be used for satellite positioning from the plurality of candidate satellites selected by the candidate-satellite selecting unit, the predetermined number of designated satellites being selected so that when the plurality of candidate satellites include a predetermined number of satellites that were previously selected as designated satellites for satellite positioning, the predetermined number of satellites selected as the designated satellites for the satellite positioning at the previous time are designated as priority satellites for further satellite positioning; and a satellite positioning unit operable to perform satellite positioning using the signals received from the priority satellites.

3. The apparatus of claim 2, wherein the candidate-satellite selecting unit selects satellites that have a variation level of signal receiving intensity that is smaller than a predetermined level for a predetermined period of time.

4. The apparatus of claim 2, wherein the available-satellite selecting unit selects satellites having at least an elevation angle greater than a predetermined value.

5. The apparatus of claim 2, wherein the available-satellite selecting unit selects satellites having at least a signal receiving intensity level higher than a predetermined level.

6. The apparatus of claim 2, wherein the available-satellite selecting unit selects satellites providing the best or better dilution of precision than a predetermined level.

7. The apparatus of claim 2, wherein when the number of candidate satellites selected by the candidate-satellite selecting unit is n or greater, where n is an integer greater than three, the designated-satellite selecting unit selects n satellites as the designated satellites to be used for the satellite positioning each time, and
when the number of designated satellites selected by the designated-satellite selecting unit is n, the satellite positioning unit performs three-dimensional positioning using the signals received from the n designated satellites.

8. The apparatus of claim 7 further comprising:
a self-contained-navigation positioning apparatus operable to perform positioning using self-contained navigation; and
a current-position determining unit operable to determine a current position based on a position determined by the satellite positioning apparatus and a position determined by the self-contained-navigation positioning apparatus,
wherein the current-position determining unit determines the current position based on the position determined by the self-contained-navigation positioning apparatus when the number of candidate satellites selected by the candidate-satellite selecting unit is smaller than three.

9. The apparatus of claim 7, wherein n is 4.

10. The apparatus of claim 9, wherein when the number of candidate satellites selected by the candidate-satellite selecting unit is three, the designated-satellite selecting unit selects the three satellites as the designated satellites to be used for the satellite positioning each time, and
when the number of designated satellites selected by the designated-satellite selecting unit is three, the satellite positioning performs two-dimensional positioning using the signals received from the three designated satellites.

* * * * *